June 17, 1930.   A. M. MAZER   1,764,966
GLASS CUTTING APPARATUS
Original Filed May 15, 1925   3 Sheets-Sheet 2
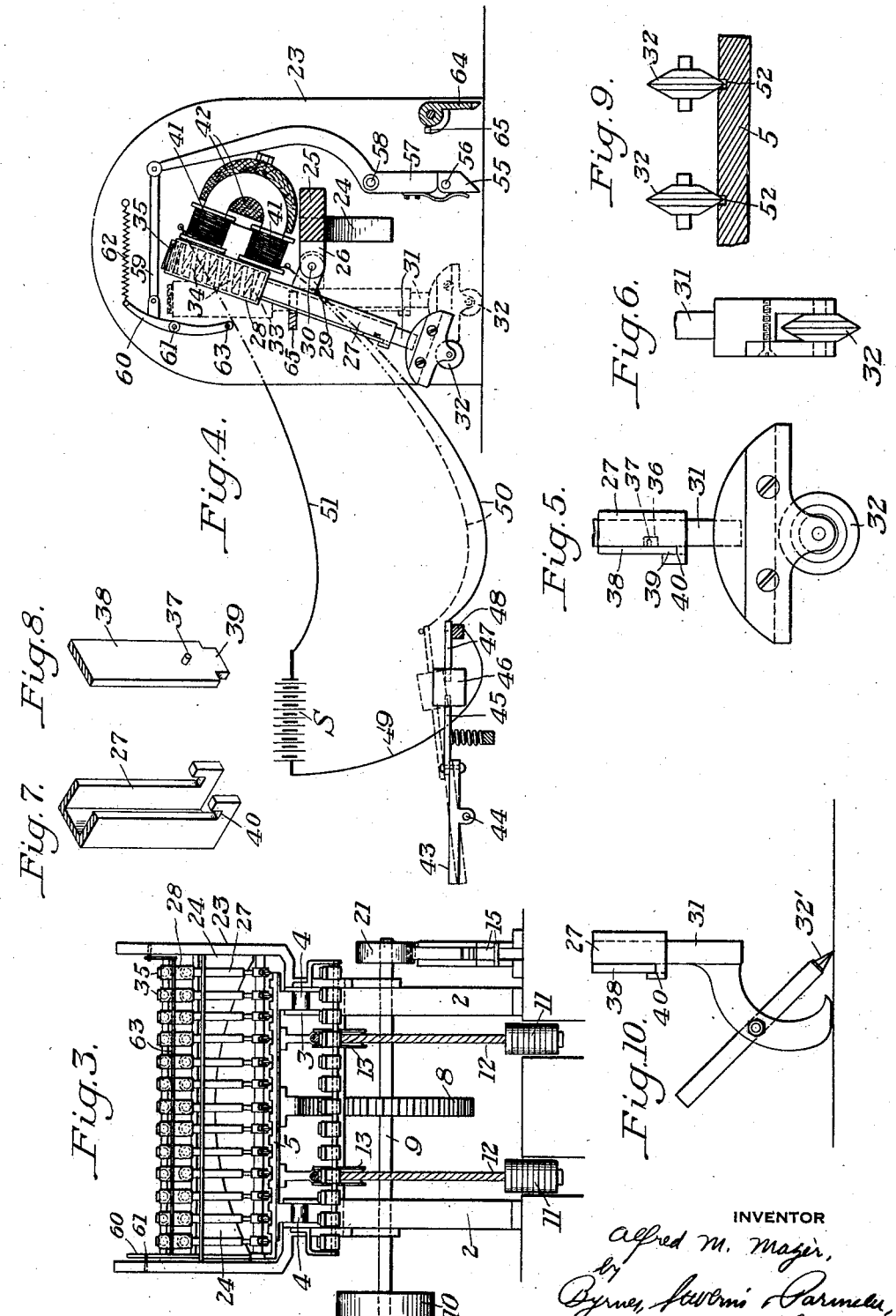

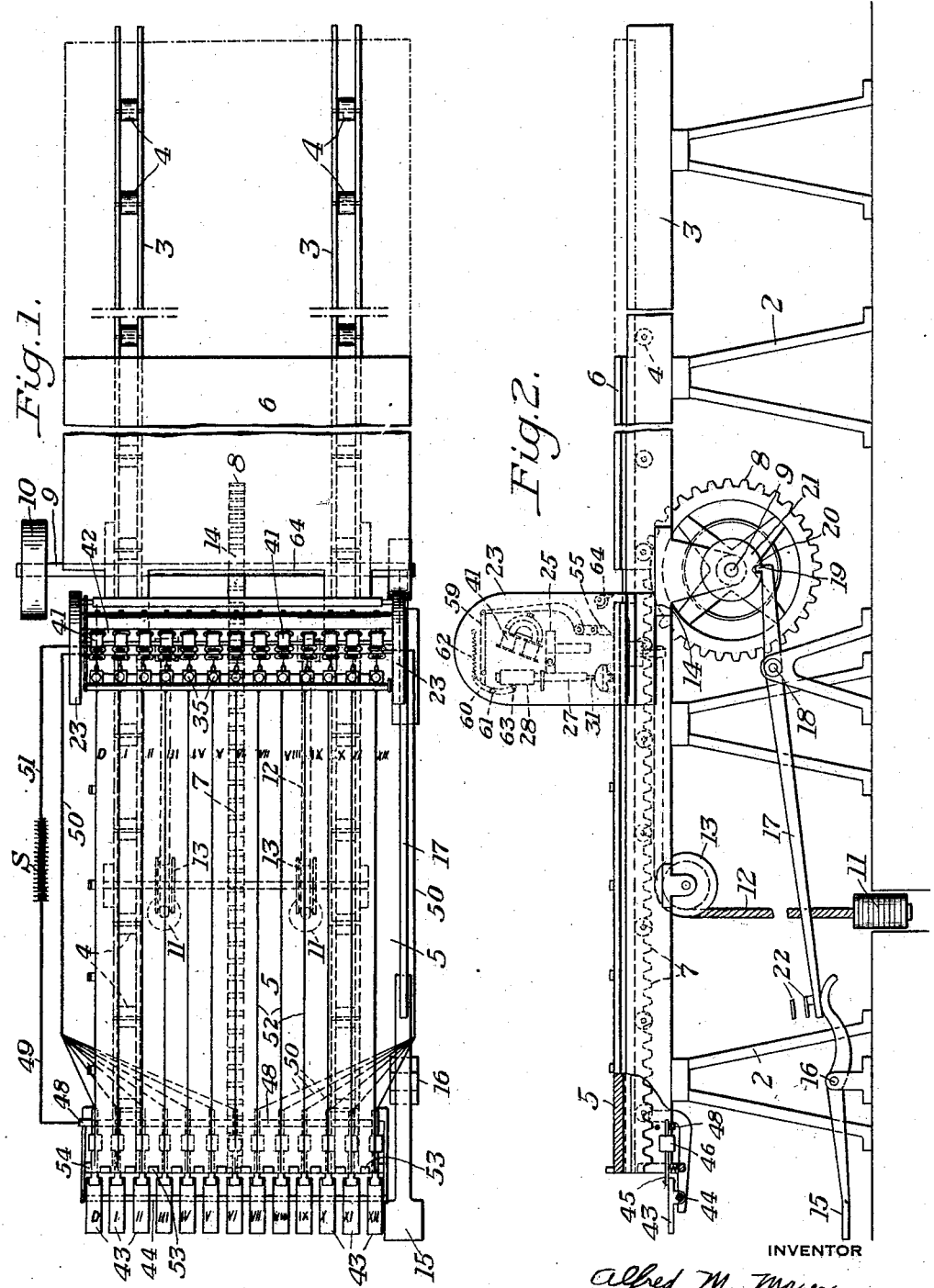

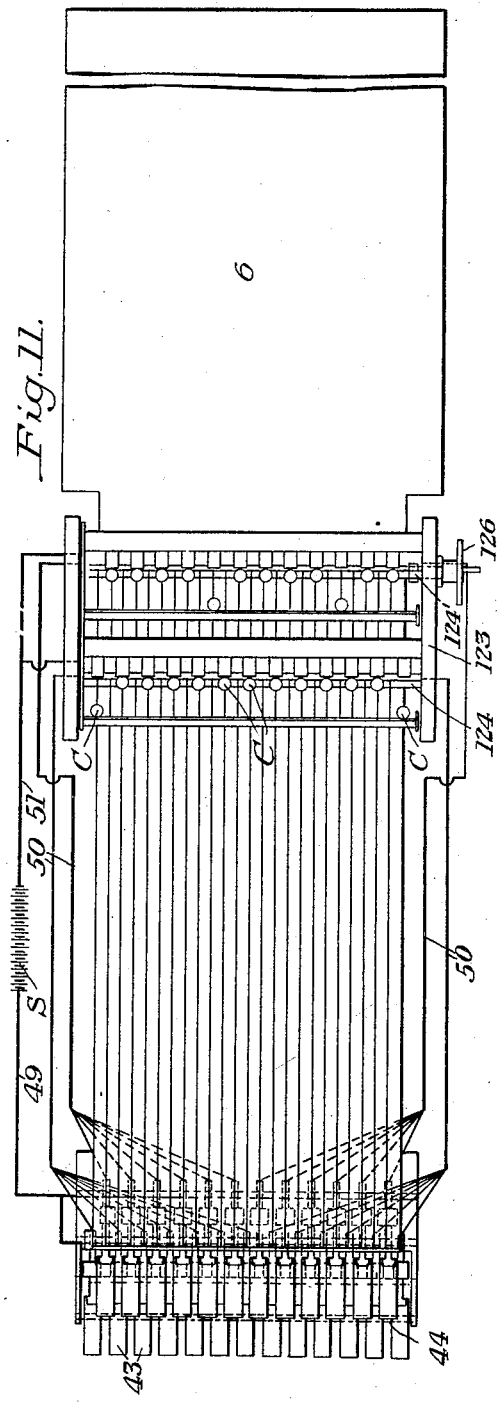
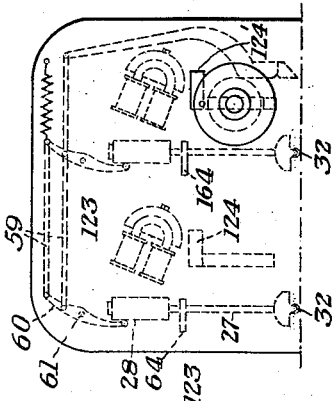
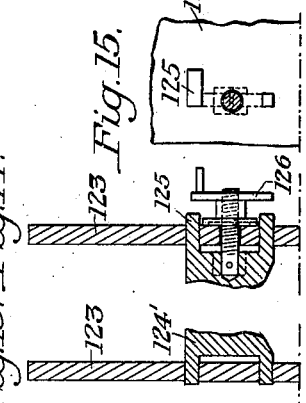
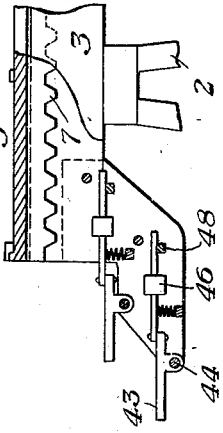

Patented June 17, 1930

1,764,966

UNITED STATES PATENT OFFICE

ALFRED M. MAZER, OF JEANNETTE, PENNSYLVANIA

GLASS-CUTTING APPARATUS

Application filed May 15, 1925, Serial No. 30,448. Renewed October 14, 1927.

The present invention relates broadly to the art of glass working, and more particularly to improved apparatus for effecting the cutting of glass as required to obtain true edges, effect the elimination of defects, or both.

At the present time it is customary in the art to which the invention relates for an operator to place a sheet of glass on a cutting table, and by individual cutting strokes effect the subdivision into pieces of maximum size having regard to the shape of the glass and the defects therein. Different types of cutter frames have also been employed for this purpose.

The present invention has for its object the provision of a cutting apparatus adapted to effect either a single cutting operation or a plurality of cutting operations simultaneously, whereby the time required for cutting up a sheet of glass is materially reduced, and the effort on the part of the operator is correspondingly lessened.

In the accompanying drawings there are shown for purposes of illustration only certain preferred embodiments of the present invention, it being understood that the drawings do not define the limits of my invention as changes in the construction and operation disclosed therein may be made without departing either from the spirit of the invention or the scope of my broader claims.

In the drawings:

Figure 1 is a top plan view, partly broken away, illustrating one form of apparatus embodying the present invention;

Figure 2 is a side elevation, partly broken away and partly in section, of the apparatus shown in Figure 1;

Figure 3 is an end elevation of the structure shown in Figures 1 and 2;

Figure 4 is a detail sectional view on an enlarged scale illustrating the construction and operation of one of the cutters;

Figure 5 is a detail elevational view, on an enlarged scale, of a portion of one of the cutters;

Figure 6 is an end elevation of a portion of the structure shown in Figure 5;

Figure 7 is a detail perspective view of a portion of the cutter guide;

Figure 8 is a perspective view of a portion of the cover for the guide shown in Figure 7;

Figure 9 is a detail sectional view through a portion of the table illustrating the manner of cooperation of the cutter with the table;

Figure 10 is a view corresponding to Figure 5 illustrating a modified form of cutter;

Figure 11 is a view similar to Figure 1, but largely diagrammatic, for the purpose of illustrating another embodiment of the present invention;

Figure 12 is a detail view, partly in elevation and partly in section, illustrating a portion of the control mechanism with the apparatus shown in Figure 11;

Figure 13 is a detail sectional view of a portion of the movable mounting permitting adjustment of the cutter;

Figure 14 is a view similar to Figure 13 illustrating the opposite end of the adjustable mounting;

Figure 15 is a vertical sectional view on the line XV—XV of Figure 14 looking in the direction of the arrows; and Figure 16 is a side elevational view illustrating a form of resetting mechanism for the cutter.

In carrying out the present invention it is contemplated that there will be utilized a table for supporting the glass, the table being in cooperative relation to a plurality of cutters so that relative movement between the cutters and table can be produced to effect the cutting operation. The cutters are under the control of an operator whereby many cutters at will may be kept in such position as to produce the desired cutting operation.

Referring more particularly to Figures 1 to 9 of the drawings, there is illustrated an apparatus of the general character herein contemplated comprising a table supporting frame 2 of any desired construction, preferably having side girders 3 between which are mounted anti-friction rollers 4 to facilitate movement of the table 5.

It will be understood that the table may have any dimensions desired, the size being limited only with respect to the size of the sheets of glass to be cut by the apparatus. Preferably, the table 5 is divided into two parts simultaneously movable. The front part of the table which is normally in a position to receive the sheet of glass which is to be cut up may be designated the cutting portion, while the other part 6 of the table is adapted to receive the cut sheet and may therefore be termed the receiving portion.

For producing movement of the table as desired, it may be provided on its under surface with a rack bar 7 adapted to be engaged by the teeth 8 of an interrupted gear mounted on a shaft 9 extending transversely of the table at substantially its intermediate portion and provided with suitable driving means 10 such as a pulley or the like. The table is normally held in the position illustrated in Figures 1 and 2 by counterweights 11 carried by cables 12 passing over pulleys 13 on the table frame and secured to the table at any convenient point. In order to permit return movement of the table to the position shown in Figures 1 and 2 after each operation therof, the teeth 8 of the driving gear are interrupted, to provide a space 14 capable of exerting no holding or driving action on the table. The length of the rack 7 and the number of teeth 8 is such that a single revolution of the shaft 9 will be effective for producing a complete movement of the table. Upon the completion of this movement the toothless space 14 will be disposed opposite the rack, whereby the counterweights will be effective for returning the table as before set forth.

The operation of the table may be controlled in any desired manner, but is conveniently controlled by providing a foot lever 15 at the front end of the table having a pivotal mounting 16 intermediate its ends. This foot lever cooperates with a stop lever 17 having a pivotal mounting 18. Upon depressing the outer end of the lever 15, the stop lever 17 will be swung in a clockwise direction about its pivotal mounting thereby pulling a detent 19 thereon out of position in a recess 20 in the drum 21 on the shaft 9. This releases the shaft for rotation. Continued depression of the foot lever will bring the contacts 22 into engagement thereby energizing the motor which drives the shaft 9, for effecting rotation of the shaft. Upon commencement of rotation of the shaft the operator releases the foot lever, the periphery of the drum 21 being effective for holding the stop lever in such position that the contacts 22 are in engagement. This condition will continue until the shaft 9 has made a complete revolution, whereupon the detent 19 will again drop into the recess 20, breaking the circuit to the motor and stopping rotation of the shaft 9 in such position that the table is free to return under the influence of the counterweights.

Carried by the table supporting frame at substantially the intermediate portion thereof may be a cutter housing 23 extending upwardly around the edges of the table 5 so as not to interfere with the travel thereof. Extending transversely of the housing is a cutter support 24 which comprises a bar 25 having a series of forwardly projecting portions 26 each adapted to form a pivotal mounting for one of the cuters. Each of the cutters comprises a channel shaped guide 27, as clearly shown in Figure 7, having secured to its upper end a spring housing 28. Projecting rearwardly from the guide 27 is an extension 29 adapted to have a pivotal connection 30 with the desired projection 26. This permits the cutter guides to swing relatively to the support and occupy either the full line position shown in Figure 4, or the dotted line position indicated therein. Extending upwardly through each of the guides 27 is a cutter stem 31 attached at its lower end to a cutter 32 of any desired construction and abutting at its upper end against a disk 33 adaped to be engaged by the lower end of a spring 34 and normally urged downwardly thereby. The upper end of the spring is engaged by a screw plug 35 in the spring housing by means of which the initial load on the spring may be varied at will. The movement of the stem 31 in a downward direction is controlled by a recess 36 therein into which projects a pin 37 carried by the detachable guide cover 38. This guide cover is adapted to be quickly applied or removed by reason of the tongue 39 at its lower end which may be interlocked upon relative longitudinal movement with the hook shaped portions 40 on the guide 27.

The spring housings 28 are conveniently constructed of magnetic material, and cooperating with each of the cutters is a holding magnet 41, the magnets being carried in suitable spaced relation in any desired manner as by blocks 42 of insulating material.

Normally, the magnets 41 are adapted to be energized for holding the cutters in their inoperative full line position indicated in Figure 4. When the magnets are de-energized, it will be apparent that the cutters will move from the full line position of this figure to the dotted line position, this movement bringing the cutters 32 into cooperative relation with a sheet of glass carried by the table for insuring the desired cutting thereof upon relative movement between the cutters and the glass. For controlling the de-energization of each of the holding magnets there is provided a plurality of keys 43 suitably mounted adjacent the front of the table and each having a pivotal mounting 44. Each key has secured thereto an extension 45 having an intermediate portion 46 of insulating material and a contact portion 47. Normally all of the contact portions are in contact with the upper surface of a contact bar 48 extending transversely of the table and having a connection 49 with one side of a source of current S. Each of the contact portions 47 has a connection 50 leading therefrom to its corresponding magnet, the circuit through each magnet being completed by a connection 51 leading to the opposite side of the source of current. With this construction, as long as the keys remain in their full line position indicated in Figure 4, the magnets will be energized for holding the cutters in inoperative position. Upon depressing any key, however, the corresponding magnet will be de-energized and the cutters released thereby will drop to operative position.

As clearly indicated in Figure 9 the table 5 is preferably provided with a series of longitudinally extending channels 52 spaced to accurately receive the cutters whereby upon relative movement between the table and the cutters the cutting edges of the cutters are prevented from injury. The front end of the table may also be provided with a series of feeding projections 53 spaced to insure passage between adjacent cutters.

In operation, a sheet of glass is placed on the cutting portion of the table, the table at this time being in normal position as indicated in Figures 1 and 2. It may be assumed, as a matter of illustration only, that the machine has a total of sixty cutters, and that the sheet to be cut is sixty-two inches in width. The operator will so position the sheet that a margin projects a small amount beyond the line of cut of the two outside cutters, and he will depress the zero key to trim the first edge. He will then look over the sheet carefully to find defects. Assuming such defects to be visible between the lines twenty-four and twenty-five on the table and also lines forty-three and forty-four, he will depress keys twenty-four and twenty-five upon finding the first defect and keys forty-three and forty-four upon finding the second defect to thereby effect the movement into operative position of the respective cutters controlled thereby in such manner that upon movement of the sheet a cut will be made on each side and closely adjacent to each of the defects. Having carefully examined the sheet and released the necessary cutters he will depress the sixty key to control the trimming of the opposite edge of the sheet, and the apparatus will be in condition for the cutting operation. After the proper keys have all been actuated to lower the desired cutters into operative position, the foot pedal 15 will be depressed and the table moved to carry the sheet of glass on the cutting portion beneath the cutters. As the table reaches the limit of its travel, a projection 54 thereon will engage the pawl 55 having a pivotal mounting 56 on the lower end of a lever 57 having a pivotal mounting 58. This engagement between the projection 54 and the pawl will tend to swing the lever 57 in a counterclockwise direction thereby causing the same to move the link 59 to the left as viewed in Figure 4 which will in turn swing a lever 60 having a pivotal mounting 61 in a counterclockwise direction against the action of a tension spring 62. The lower end of the lever 60 is so positioned that upon movement of the lever in a counterclockwise direction the transversely extending rod 63 carried thereby will engage the spring housings of the cutters and move the same from the dotted line position to their full line position in which position they are held by the retaining magnets. In this manner the cutters which have been in operation are automatically reset by the concluding cutting movement of the table.

Upon the return movement of the table, the projection 54 will pass freely under the pawl 55 which is free to swing in a direction to permit this movement. The leading edge of the glass on the cutting portion of the table will, however, come into contact with the glass engaging pawl 64. This pawl, as viewed in Figure 4, is free to rotate in a counterclockwise direction to permit the travel of the glass beneath the same, but is prevented from rotating in a clockwise direction beyond the position shown in this figure by a stop 65. The continued return travel of the table therefore will cause the pawl 64 to slide the glass from the cutting portion of the table to the receiving portion, so that upon conclusion of the return movement the cut glass will be on the receiving portion 6 of the table in position to be removed either by the same operator or another operator as desired.

In lieu of the cutters 32, ordinary diamond point cutters 32′ may be substituted therefor as well understood in the art, as shown for example in Figure 10.

With the construction before described, it will be apparent that if the cutters are normally spaced a distance of an inch, it will always be necessary to effect the removal of an inch of glass irrespective of the width or size of any defect in the intermediate portion of the sheet. In order to overcome this difficulty, the cutters may all be made adjustable, so that the exact line of cut may be varied, or a second set of cutters may be utilized. Where the second set is provided, the cutters will preferably have a lateral movement substantially equal to the distance between the adjacent fixed cutters whereby a cut may be made at any point intermediate the fixed cutters. In Figures 11 to 16 of the drawings there is indicated a combination of cutters of this character, the housing 123 carrying a fixed cutter support 124 and an adjustable cutter support 124′. This adjustable cutter support may be of the construction before described, but has its ends 125 extended through the housing 123 so as to be guided therein. Cooperating with one or both ends of the adjustable support is an adjusting device 126 by means of which the entire support may be moved transversely of the table to any desired position. In Figure 11 the two sets of cutters are indicated diagrammatically, the line of cut of each cutter coinciding with the centers of the circles C which designate the cutters. The outer cutters C of the first set are shown as being in operative position while two of the intermediate cutters of the adjustable series are shown as being in operative position. In the showing of Figure 11 the adjustable cutters have been so adjusted that their line of cut is exactly intermediate the line of cut of adjacent fixed cutters. It will be obvious that by reason of this construction the adjustable cutters may be used independently of the fixed cutters or they may be used conjointly therewith. Where the double set of cutters is provided, there will also preferably be utilized a double keyboard as shown in the drawings whereby operation of the proper cutter is facilitated, the keys of one row controlling the stationary cutters and the keys of the other row controlling the adjustable cutters.

It will be understood that in order to give rigidity to the cutters, for properly holding the cutters during the cutting operation, there may be provided a notched bar 65 as clearly shown in Figure 4, for the non-adjustable cutters. A similar adjustable bar 164 may be provided for the adjustable cutters, as illustrated in Figure 16.

The advantages of the present invention arise from the provision of the cutting apparatus embodying a plurality of cutters adapted to be controlled by the operator for effecting a plurality of cuts simultaneously.

Further advantages arise from the provision of the control mechanism for the cutters, and from the provision of adjusting means whereby the cutters may be adjusted for cutting at any desired intermediate points.

I claim:

1. In a glass cutting apparatus, a plurality of individually mounted cutters independently movable at all times, any number of which may be utilized for a simultaneous cutting operation at the will of an operator upon relative movement between the cutters and the glass to be cut, means for mounting the cutters for such relative movement, means for normally maintaining all of the cutters out of cutting position, means controlling the release of the number of cutters it is desired to have operative at any time, and means for simultaneously returning all of the released cutters to and retaining them in nonoperative position upon completion of the cutting operation.

2. In a glass cutting apparatus, a glass support, cutters for cutting the glass on the support, means for causing relative movement between the support and cutters to cut the glass on the support, a glass receiving table, and means for effecting transfer of the cut glass from the support to the table upon the return movement of the parts for the next cut.

3. In a glass cutting apparatus, a plurality of groups of individually mounted, independently movable cutters so arranged that any number of cutters of any group may be utilized for simultaneous cutting operation at the will of an operator upon relative movement between the cutters and the glass to be cut, means for effecting adjustment of the cutters of one group, means providing for such relative movement, and a group of control devices remote from the cutters and readily accessible to the operator for controlling the number of cutters in operative position at any time.

4. In a glass cutting apparatus, a row of relatively fixed cutters, a second row of cutters adjustable transversely with respect to the relatively fixed cutters, means for simultaneously adjusting said last-mentioned cutters, means controlling the number of cutters in operation at any time, including a group of control devices remote from the cutters and readily accessible to the operator for controlling relative movement between the cutters into and out of operative position.

5. In a glass cutting apparatus, a plurality of individually mounted cutters independently movable at all times and adapted to occupy operative or inoperative positions, means for producing relative movement between the cutters and a sheet of glass to be cut, means automatically operable at a predetermined point during every such relative movement for returning all of the used cutters to and retaining them in inoperative position after each cut until manually released, and means under the control of the operator for individually releasing and thereby controlling movement of any of said cutters to operative position.

6. In a glass cutting apparatus, a supporting table, a plurality of cutters provided for cooperation therewith, means normally holding said cutters in inoperative position, and a control keyboard adjacent said table and having an individual key for controlling each cutter, and means controlled thereby for rendering the holding means for each cutter ineffective.

7. In a glass cutting apparatus, a glass supporting table, a plurality of cutters mounted for cooperation with a sheet of glass on said table, electric means normally maintaining all of said cutters in inoperative position, a circuit controlling keyboard cooperating with said table and comprising a key for each cutter, and means controlled thereby for effecting the release of the respective cutters at will.

8. In a glass cutting machine, a plurality of cutters adapted for movement to occupy either operative or inoperative position, a glass supporting table, means to move the table and cutters relative to each other to cut the glass, means normally operated only at the conclusion of every cutting operation for simultaneously moving all of the previously operative cutters to and retaining them in inoperative position until manually released, and means under the control of an operator for controlling the release and thereby the movement of any of said cutters to operative position.

9. In a glass cutting machine, a plurality of movable cutters adapted to occupy either operative or inoperative position, means operative at the conclusion of every cutting operation for effecting movement of all of the previously operative cutters to inoperative position, and means under the control of an operator for controlling the movement of any of said cutters to operative position, said last mentioned means including a keyboard remotely positioned relative to said cutters and having controlling keys operatively connected with their respective cutters.

10. In a glass cutting machine, a table adapted to support the glass to be cut, said table having a plurality of cutting lines indicated thereon, cutters each bearing a definite relation to its respective cutting line, said cutting lines each having indicating indicia therefor, and control keys for the respective cutters having indicia thereon corresponding to the indicia for said cutting lines.

11. In a glass cutting apparatus, a plurality of cutters individually mounted and at all times individually movable to either operative or inoperative position, means effective for normally holding said cutters in inoperative position, means remote from but having connection with said cutters and under the control of an operator for controlling the release individually of any of said cutters at will, a glass supporting table, means for moving the table and cutters relative to each other to cut the glass, and means operative upon the conclusion of every cutting operation for effecting return of the cutters to inoperative position.

12. In a glass cutting apparatus, a plurality of cutters individually mounted and at all times individually movable to either operative or inoperative position, magnetic means effective for normally holding said cutters in inoperative position, circuit control means remote from but having connection with said cutters and under the control of an operator for controlling the release individually and at will of any of said cutters, and means operative upon the conclusion of every cutting operation for effecting return of the released cutters to inoperative position.

13. In a glass cutting apparatus, a plurality of cutters individually mounted and at all times individually movable to either operative or inoperative position, magnetic means effective for normally holding said cutters in inoperative position, circuit control means remote from but having connection with said cutters and under the control of an operator for controlling the release individually and at will of any of said cutters, and means operative upon the conclusion of every cutting operation for effecting return of the released cutters to inoperative position, said control means comprising a keyboard having an individually operable key for each of said cutters.

14. In a glass cutting apparatus, a glass supporting table, a plurality of cutters any of which may be brought into operative cutting position at the will of an operator, means to move the table and cutters relative to each other to cut the glass, and means automatically operative upon the conclusion of every cutting operation for moving said cutters to and maintaining them in inoperative position by said relative movement.

15. In a glass cutting apparatus, a glass supporting table, a plurality of cutters cooperating therewith, a receiving support for cut glass, and means cooperating with said table for permitting idle movement of glass thereunder during movement of the table in a cutting direction and effective for transferring cut glass to said support upon movement of the table in a return direction.

16. In a glass cutting apparatus, a plurality of cutters, magnetic means for each of said cutters and normally operative for maintaining the cutters in inoperative position, a keyboard, a key in said keyboard for each of said cutters, and circuits for said magnetic means under the individual control of the respective keys.

17. In a glass cutting apparatus, a plurality of pivotally mounted cutters, magnetic means for each of said cutters, and means cooperating with the magnetic means for normally maintaining said cutters in inoperative position, means controlling the release of said cutters to operative position, and means operative upon the conclusion of each cutting operation for swinging all of the previously operative cutters to inoperative position.

18. In glass cutting apparatus, means for supporting the glass, a plurality of cutters arranged in proximity thereto, means for causing relative movement between the cutters and glass to be cut, means for effecting individual movement of the cutters into operative position, and means operable automatically upon relative movement between the cutters and glass to be cut for engaging the operative cutters and moving them out of such position and maintaining them in inoperative position.

19. In glass cutting apparatus, means for supporting the glass, a plurality of cutters arranged above the glass, means for causing relative movement between the cutters and glass to be cut, electrical control means operable to effect individual and selective movement of the cutters into cutting position, and means operable automatically at a predetermined time upon relative movement between the cutters and glass to be cut for automatically returning the cutters to and maintaining them in a non-cutting position.

20. In glass cutting apparatus, means for supporting the glass, a plurality of cutters arranged above the glass, a group of control devices remote from the cutters, connections between said control devices and said cutters and under the control of an operator for effecting individual and selective movement of the cutters into cutting position, and means for automatically moving all of the cutters which are in cutting position out of such position and maintaining them in inoperative position at the completion of the cutting operation.

21. In glass cutting apparatus, means for supporting the glass, a plurality of cutters arranged above the glass, means for causing relative movement between the cutters and glass to be cut, a group of stationary control devices remote from the cutters, connections between said control devices and said cutters and under the control of an operator for effecting individual and selective movement of the cutters into cutting position, and means operable upon relative movement between the cutters and glass to be cut for automatically returning the cutters to and maintaining them in a non-cutting position at the completion of the cutting operation.

22. In glass cutting apparatus, means for supporting the glass, a plurality of pivotally mounted cutters above the glass, separate control means associated with each cutter and operable to effect individual and selective rocking of said cutters into cutting position, and means for simultaneously rocking all of said cutters in the opposite direction out of cutting position at the completion of the cutting operation.

23. In glass cutting apparatus, means for supporting the glass, a plurality of pivotally mounted cutters above the glass, means for effecting relative movement between the cutters and glass to be cut, separate control means associated with each cutter and operable to effect individual and selective rocking of said cutters into cutting position, and means operable upon relative movement between the cutters and glass to be cut for simultaneously rocking all of said cutters in the opposite direction to and maintaining them in non-cutting position at the completion of the cutting operation.

24. In glass cutting apparatus, means for supporting the glass, a plurality of pivotally mounted cutters above the glass, means for effecting relative movement between the cutters and glass to be cut, electrical control means having a part thereof remote from the cutters and under the control of an operator for effecting individual and selective rocking of said cutters into cutting position, and means operable upon relative movement between the cutters and glass to be cut for simultaneously rocking all of said cutters to and maintaining them in non-cutting position at the completion of the cutting operation.

25. In glass cutting apparatus, means for supporting the glass, a plurality of cutters above the glass, individual means for independently maintaining the cutters in a non-cutting position, a group of control devices remote from the cutters, connections between said cutters and said control devices and under the control of an operator for rendering the holding means ineffective to cause movement of the cutters into cutting position, and means operable at the completion of the cutting operation to again render the holding means effective whereby the previously operative cutters are rendered inoperative.

26. In glass cutting apparatus, a plurality of individually mounted cutters independently movable at all times into and out of cutting position, means for causing relative movement between the cutters and glass to be cut, a manually operable common control means remote from the cutters for effecting selective movement of said cutters into cutting position, and means operable upon relative movement between the cutters and glass to be cut for returning the cutters to and maintaining them in a non-cutting position at the completion of the cutting operation.

27. In glass cutting apparatus, a plurality of individually mounted cutters independently movable at all times into operative and inoperative positions, an electro-magnet associated with each cutter and adapted when energized to maintain its respective cutter in one of its two positions and when de-energized to cause movement of said cutter to its other position, and means remote from said cutters and under the control of an operator for individually and selectively controlling the energizing and de-energizing of said magnets.

28. In glass cutting apparatus a plurality of individually mounted cutters independently movable at all times into and out of cutting position, a plurality of electro-magnets, one being associated with each cutter and a plurality of control devices, one control device being provided for each cutter and connected in series with its respective electro-magnet.

29. In glass cutting apparatus, means for supporting the glass, a plurality of cutters arranged above said supporting means, a separate electro-magnet associated with each cutter, and a keyboard connected with said electro-magnets for controlling the movement of said cutters.

30. In glass cutting apparatus, means for supporting the glass, a plurality of cutters arranged above the glass, an electro-magnet for each cutter, a circuit therefor, and a switch in each circuit under the control of an operator to effect individual and selective movement of the cutters into cutting position.

31. In glass cutting apparatus, means for supporting the glass, a plurality of cutters arranged above the glass, a mounting for said cutters, a group of stationary control devices independent of and remote from said mounting, and connections between said control devices and said cutters and under the control of an operator for effecting individual and selective movement of the cutters into cutting position.

32. In glass cutting apparatus, means for supporting the glass, a plurality of cutters above the glass, a mounting carrying said cutters, a keyboard independent of said mounting for controlling the movement of said cutters, and operative connections between said keyboard and cutters.

33. In glass cutting apparatus, means for supporting the glass, a plurality of pivotally mounted cutters above the glass, electrical operating means for the cutters, means remote from said cutters for controlling said electrical operating means and under the control of an operator for effecting individual and selective rocking of said cutters into cutting position, and means for rocking all of the cutters which are in cutting position out of such position at the completion of the cutting operation.

34. In glass cutting apparatus, a plurality of cutters independently movable at all times into and out of cutting position, a mounting for the cutters, manually operable common control means independent of and remote from said mounting, connections between said control means and said cutters for effecting selective movement of said cutters into cutting position, and means for returning the cutters to a non-cutting position at the completion of the cutting operation and for maintaining them in such position.

35. In glass cutting apparatus, a glass supporting table, a plurality of cutters arranged above the table, a mounting for the cutters, a keyboard independent of and remote from said mounting, and means operatively connected to said keyboard to effect a relative movement between said cutters and said table.

36. In glass cutting apparatus, a glass supporting table, a plurality of cutters arranged above the table, operating mechanism associated with each cutter, a plurality of control devices independent of the operating mechanism and arranged in keyboard formation, and connections between said control devices and said operating mechanisms whereby upon actuation of the control devices the cutters may be selectively moved into cutting position from a single control station.

37. In glass cutting apparatus, a glass supporting table, a plurality of cutters arranged above the tables, individual operating mechanism associated with each cutter, a plurality of stationary control devices independent of and remote from the operating mechanism and arranged in keyboard formation, and connections between said control devices and said operating mechanisms whereby upon actuation of the control devices the cutters may be selectively moved into cutting position from a single control station.

In testimony whereof I have hereunto set my hand.

ALFRED M. MAZER.